Sept. 20, 1960     H. A. LEHMAN     2,953,241

TORQUE ARM CONVEYOR DRIVE

Filed July 7, 1959     2 Sheets-Sheet 1

Inventor
Herbert A. Lehman
Attys.

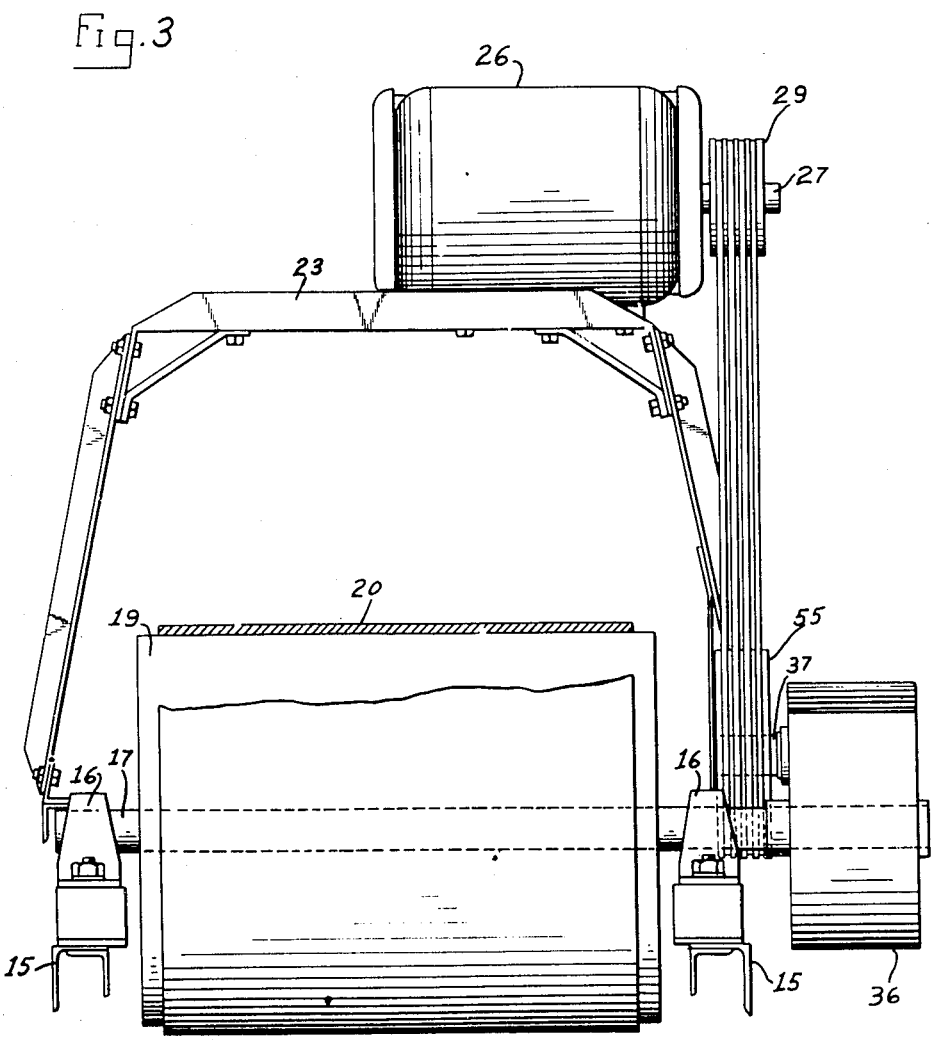

United States Patent Office 2,953,241
Patented Sept. 20, 1960

2,953,241

TORQUE ARM CONVEYOR DRIVE

Herbert A. Lehman, Aurora, Ill., assignor to Barber-Greene Company, Aurora, Ill., a corporation of Illinois Filed July 7, 1959, Ser. No. 825,589

4 Claims. (Cl. 198—203)

This invention relates to improvements in speed reducer drive mechanisms particularly adapted to drive belt conveyors and the like.

A principal object of the invention is to provide a simplified compact and improved form of drive for the belt of a conveyor, arranged with a view toward reducing overhanging drive loads on the drive mechanism for the conveyor.

A further object of the invention is to provide an improved form of torque arm reducer drive for a conveyor belt, in which a torque arm reducer has direct connection with the roller for driving the conveyor belt and the drive to the reducer is located between the edge of the belt and the inside of the reducer so as to more uniformly distribute the drive loads and to avoid the necessity of using overhanging supports or drive shafts in the drive to the reducer.

Still another object of the invention is to provide an improved form of drive mechanism for conveyor belts and the like, in which a torque arm reducer provides a direct driving connection to the drive roller for the belt and in which the drive motor is mounted on the conveyor frame structure in vertically spaced relation with respect to the belt, and the drive from the motor to the torque arm reducer is between the reducer and the edge of the belt, and thereby avoiding the need for overhanging drive shafts or overhanging supports for the drive motor, and providing a more favorable weight distribution in the support structure for the motor.

Still another object of the invention is to provide a conveyor drive mechanism for belt conveyors and the like having a torque arm reducer mounted on the drive shaft for the conveyor belt, in which the reducer is driven from the motor by a belt drive, with the drive pulley on the inside of the reducer and in which the reducer is so arranged that it may be assembled on either side of the drive roller, with the belt drive to the reducer always on the inside of the reducer.

These and other objects of the invention will appear from time to time as the following specification proceeds and with reference to the accompanying drawings wherein:

Figure 1 is a fragmentary view in side elevation of the drive end of a conveyor belt showing a drive mechanism constructed in accordance with the invention having driving connection with the drive roller for the conveyor belt;

Figure 2 is a fragmentary sectional view taken substantially along line II—II of Figure 1 and illustrating the mounting of the torque arm reducer on the conveyor roller drive shaft; and Figure 3 is an end view of the belt conveyor shown in Figure 1, with certain parts broken away and with the belt shown in transverse section.

In the embodiment of the invention illustrated in the drawings, the outby or drive end section of a conveyor frame structure 10 is shown as including parallel upper frame members 11 and lower frame members 12 suitably trussed and transversely connected together and connected at their rear ends to vertically extending angles 13. Parallel spaced frame members 15 extend rearwardly from the angles 15 and form a support for journal boxes 16, for a transverse shaft 17 and adjustably moved along said frame members by take-ups indicated generally by reference character 18. The shaft 17 has a roller 19 keyed or otherwise secured thereto, and forming a drive roller for an endless conveyor belt 20. The frame members 15 are braced to the angles 13 by trusses or braces 21.

The belt 20 extends from the drive roller 19 toward the forward or inby end of the frame structure 10 and is supported on the usual idler rollers (not shown), which may be troughed rollers spaced along the frame structure 10 and supporting the belt in a conventional manner.

A platform 23 is supported in vertically spaced relation with respect to the belt 20 on spaced legs 24 and 25 suitably secured at their lower ends to the angles 11. The platform 23 forms a support for a motor 26, herein shown as being an electric motor, but which may be any form of motor desired. The motor 26 has a motor shaft 27 overhanging the platform 23, and has a plural grooved drive pulley 29 keyed or otherwise secured thereto, for driving the shaft 17 and drive roller 19 in a manner which will now be described.

The shaft 17 projects to one side of the angles 15 and is shown in Figure 2 as extending through a sleeve 30 having a drive gear 31 of the reducer keyed or otherwise secured thereto. The sleeve 30 in turn may be keyed or otherwise secured to the shaft 17, to drive said shaft and the roller 19.

The sleeve 30 is journaled in antifriction bearings 32, suitably carried in opposite walls 35 of a gear reduction casing 36, and retained to said casing by inner and outer end caps 33 and 34 bolted or otherwise secured to the opposite side walls 35. The sleeve 30 and bearings 32 mount said gear casing for adjustable movement about the axis of the drive shaft 17.

The gear casing 36 is of an elongated form and has a shaft 37 journaled therein, adjacent the opposite end thereof from the shaft 17 and projecting inwardly therefrom toward the drive roller 19 and belt 20. The shaft 37 has a spur gear 39 keyed or otherwise secured thereto, meshing with and driving an intermediate gear 40 journaled within the casing 36 and meshing with and driving the drive gear 31.

The gear casing 36 is also shown as having an arm 41 extending from the end thereof opposite the gear 31, forming a mounting for an eye bolt 43 of an adjustable torque arm linkage 44, on a pivot pin 45. The eye bolt 43 is threaded within one end of a connector 46 in the form of the connector of a turnbuckle, and is locked from turning movement with respect thereto, as by a nut 47. An eye bolt 49 is threaded within the opposite end of the connector 46 from the eye bolt 43 and is locked from turning movement with respect thereto as by a lock nut 50. The eye bolt 49 is shown as being mounted on a bracket 51, in outwardly spaced relation with respect to the angle 13, on a pivot pin 53. The adjustable linkage 44 thus supports the casing 36 and holds said casing from rotation about the axis of the transverse shaft 17.

The adjustable linkage 44 also affords a means for varying the tension of drive belts 56 trained about the grooves of the motor pulley 29 and trained about the grooves of a driven pulley 55 keyed or otherwise secured to the shaft 37, between the inner wall 35 of the casing 36 and the end of the drum 19 and edge of the belt 20 and forming a drive pulley for said torque reducer.

The motor 26 on the platform 23 may thus be supported on said platform with a minimum of overhang and a direct drive connection may be provided from said motor to the shaft 37 of the speed reducer, driving said reducer within the confines of the casing 36 with a minimum of overhang.

Where it may be desired to provide the reducer casing 36 at the left instead of the right hand end of the shaft 17, as shown in Figure 3, it is merely necessary to invert the casing 35 and thereby position the drive pulley 55 on the inside of said casing and connect the arm 41 with the adjustable torque linkage connection 44.

While I have herein shown and described one form in which my invention may be embodied, it may readily be understood that various variations and modifications in the invention may be attained without departing from the spirit and scope of the novel concepts thereof, as defined by the claims appended hereto.

I claim as my invention:

1. A torque drive particularly adapted for driving conveyors and the like comprising a drive roller, a transverse shaft supporting and driving said roller, an elongated reduction gear casing rockingly mounted on said shaft, reduction gearing journaled within said casing, for driving said shaft, a drive shaft for said reduction gearing journaled within said casing, parallel to the axis of rotation of said roller and extending inwardly of said casing toward said pulley, a flexible drive connection to said shaft, and an adjustable torque linkage connection supporting said casing and retaining said casing from rotation about the axis of said transverse shaft.

2. In a conveyor drive particularly adapted for belt conveyors and the like, a frame, a transverse shaft journaled on said frame, a drive roller on said shaft, a belt trained about said roller and driven therefrom, means for driving said transverse shaft and roller comprising an elongated reduction gear casing journaled on said shaft for movement about the axis thereof, reduction gearing journaled within said casing for driving said shaft, a drive shaft for said reduction gearing journaled in said casing and extending outwardly of said casing toward said roller and belt, a motor mounted above said roller and belt within the lateral limits of said frame, and a belt drive connection from said motor to said drive shaft extending along the inside of said reduction gear casing and the outside of said pulley and belt.

3. A conveyor drive in accordance with claim 2, in which an adjustable torque arm linkage connection is provided between said frame and said casing, supporting said casing and retaining said casing from rotation about said transverse shaft.

4. In a conveyor drive particularly adapted for driving belt conveyors and the like having an endless belt, a frame, a drive roller forming a direction changing device for the endless belt and having driving engagement therewith, a transverse shaft journaled in said frame and forming a support and drive shaft for said drive roller, a motor mounted on said frame within the lateral limits thereof and in vertically spaced relation with respect to said drive roller and belt and having a motor shaft extending parallel to said transverse shaft, a motor pulley on the outer end of said motor shaft, and a reduction drive from said motor pulley to said transverse shaft including an elongated reduction gear casing mounted on said transverse shaft for adjustable movement about the axis thereof, reduction gearing journaled within said casing for driving said shaft, a drive shaft for said reduction gearing rotating about an axis parallel to said transverse shaft and extending inwardly of said casing toward said roller, a drive pulley on said drive shaft on the outside of said casing, an endless belt trained about said motor pulley and said drive pulley between the inside of said casing and the edge of said belt, and an adjustable torque arm linkage connection, supporting said reduction gear casing and retaining said casing from rotation about said transverse shaft, and adjustable to vary the tension of said belt.

References Cited in the file of this patent

FOREIGN PATENTS 1,020,039    France _____ Nov. 12, 1950